United States Patent [19]

MacKeown

[11] 3,930,683
[45] Jan. 6, 1976

[54] DEMOUNTABLE PNEUMATIC TIRE RIM ASSEMBLY

[76] Inventor: Graeme J. MacKeown, Box 127, Rte. 5, Marysville, Ohio 43040

[22] Filed: Nov. 27, 1974

[21] Appl. No.: 527,905

[52] U.S. Cl.................. 301/11 R; 301/17; 152/412
[51] Int. Cl.² ......................................... B60B 23/04
[58] Field of Search..... 301/9 R, 9 DH, 9 TV, 10 R, 301/11 R, 11 CD, 11 S, 14, 17, 25, 26, 35 R, 35 BJ, 35 SL, 63 R, 63 D, 63 DS, 105, 121; 152/396, 402, 405, 411–413

[56] References Cited
UNITED STATES PATENTS

| | | | |
|---|---|---|---|
| 1,093,071 | 4/1914 | Pearson | 152/412 |
| 1,497,725 | 6/1924 | Hummel | 301/26 |
| 3,063,488 | 11/1962 | Bennett et al. | 152/405 X |
| 3,612,614 | 10/1971 | Ware | 301/63 R |

*Primary Examiner*—John J. Love
*Assistant Examiner*—Andres Kashnikow

[57] ABSTRACT

A pneumatic tire and wheel assembly may be disassembled, so that the tire may be removed after deflation, simply by rotating a cylindrical removable outer rim so as to disengage a respective locking lug on the wheel from a corresponding recess on the removable outer rim. There are eight locking lugs spaced 45 degrees apart on the fixed rim of the wheel and corresponding recesses in the removable outer rims so that without removing the fixed wheel rim from the hub of the automobile it is possible simply by rotating and pulling to remove the removable outer rim after first deflating the tire and then it is possible to remove and replace the tire without the use of bead breaking or bead stretching equipment by inflating the tire back to normal pressure thereby locking the removable rim in place.

1 Claim, 7 Drawing Figures

DEMOUNTABLE PNEUMATIC TIRE RIM ASSEMBLY

BACKGROUND OF THE INVENTION

1. Field of the Invention

Vehicle wheel construction and particularly demountable and detachable wheel construction.

2. Description of the Prior Art

The practical state of the art in automobile vehicles at the present time comprises a fixed wheel assembly which includes the internal supporting structure commonly called the spider in the interior of which there is centrally located the circular portion having a plurality of lug bolt openings therein whereby the entire wheel assembly including the usual tubeless tire is removed in one complete assembly and replaced in the same condition. It is therefore virtually impossible, certainly highly impractical, to try and remove a tubeless pneumatic tire from a wheel on the side of the road or in any other location other than a service station or the like where there is conventional bead breaking equipment for breaking the bead off the rim and for stretching the bead sufficiently to remove and replace same. However, there are many instances where it is not possible to find service station equipment and there is a great demand for a simple, inexpensive wheel construction which can be disassembled or demounted without any special tools and on the side of the road or at home. It is entirely possible that in the future automobile tires will be again self contained as in the older art and also it is possible that more people will be changing tires themselves rather than having it done at a station. There are large truck tires rims or industrial earth moving rims and the like which can be disassembled by removing bolts and parts but these rims are very large, expensive and special and unsuitable for passenger car or smaller truck use. The present device provides a simple construction in vehicle wheels whereby one side of the wheel may be rotated and demounted without special service station equipment.

SUMMARY OF THE INVENTION

A primary object of this invention is to provide a demountable tire rim assembly for vehicle wheels whereby a person may disassemble a vehicle wheel while it is still mounted on the vehicle so as to remove and replace a tire.

Still another object of this invention resides in the construction whereby one side of a vehicle wheel which is in the form of a cylindrical rim structure with recesses thereon may be rotated and removed.

Another object of this invention is to provide an improved rim for pneumatic tires by having a fixed and a removable bead-flange so that a tire, tubeless or otherwise, may be assembled and disassembled from and to its rim with comparative ease without the necessity of having service station tire removal and mounting equipment.

An additional object of this invention is to provide a demountable pneumatic tire rim assembly as mentioned previously which will accommodate any and all conventional tires as well as solid construction tires.

Other and further objects and advantages of this invention will become apparent upon reading the following specification taken in conjunction with the accompanying drawings.

DESCRIPTION OF THE PREFERRED EMBODIMENT

Figure 6:
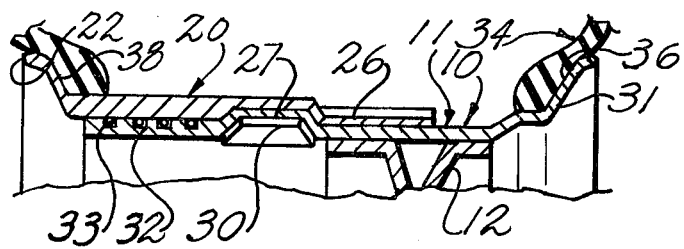
FIG. 6 is a transverse cross-sectional view of the top portion of the assembled wheel.
Figure 1:
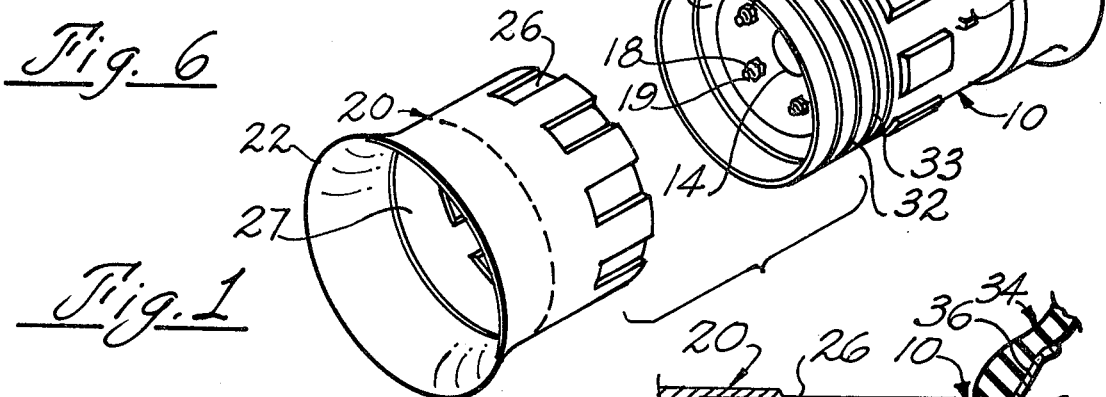
FIG. 1 is a perspective view of the present rim and wheel assembly.

In FIG. 1 there is shown a wheel assembly 10 which comprises a fixed support rim 11 employing the usual internal spider 12 construction which is forged, stamped or otherwise formed from heavy metal plate to include the internal center mounting portion 14 about which there are fixed lug bolt openings 16 which accommodate lug nuts 18 on lug bolts or studs 19. This is essentially of conventional construction whereby the wheel spider 12 is mounted on projecting studs 19 on the mounting assembly fastened on a vehicle at the five usual locations thereon. The wheel 10 however and spider 12 have been modified to omit the usual rim on one side which is normally an integral and fixed part of the entire rim and wheel assembly.

The removable outer rim is designated by reference numeral 20 and comprises a cylindrical structure of heavy metal plate having an external circular tire bead flange 22. A plurality of recesses or locking channels 26 are located along the inner face of the removable outer rim and there are in the present embodiment 8 such recesses located approximately 45° apart. Behind each locking channel 26 is a lug cavity 27 created by a continuous recessed annular ring.

The cylindrical projecting portion 28 of the fixed wheel support rim 11 has formed thereon a plurality of locking lugs 30 which fit into respective cavities 27 and may be as shown in the present embodiment formed by creating convex shapes in the metal material or if preferred can be solid lugs welded to the metal surface (not shown). The peripheral edge of support rim 11 has a tire bead flange 31. Inwardly of the locking lugs 30 there is located a plurality of grooves 32 in each of which is located a flexible O-ring 33, made of rubber, plastic and the like, providing air sealing devices or gasketing between the removable outer rim and the fixed rim for use with tubeless tires. The O-rings 33 and grooves 32 may be omitted for use with self-contained tires or when a tube is used. Inwardly of the locking lugs 30 are stop bosses 41 for limiting the travel and rotation of rim 20. The wheel assembly is pneumatically locked together upon inflation of a tire 34 causing the tire beads 36 to seat on flanges 22, 31 thereby preventing disassembly by the air pressure within the tire. The greater the pressure, the tighter the lock.

In the embodiment shown a ⅛ turn counter-clockwise is required when mounting or demounting the tire from the driver's side of the vehicle. A ⅛ turn clockwise is required when mounting or demounting a tire from the opposite side of the car. The inner fixed support rims 11 on the studs 19 are left and right hand respectively because when a vehicle is viewed from the driver's side the wheels are rolling counter-clockwise and when viewed from the other side the wheels are rolling clockwise, or vice versa.

Figure 7:
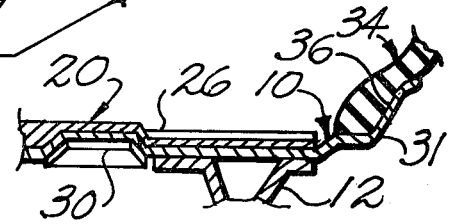
FIG. 7 is a cross-sectional view of a modification.
Figure 3:
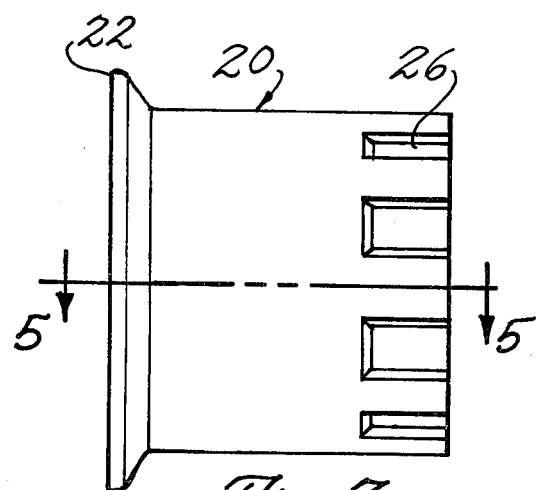
FIG. 3 is a side elevation view of the removable outer rim.
Figure 5:
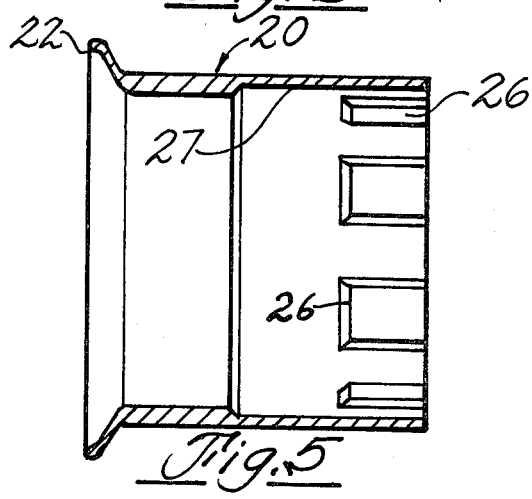
FIG. 5 is a cross-sectional view taken substantially along lines 5—5 in FIG. 3.
Figure 2:
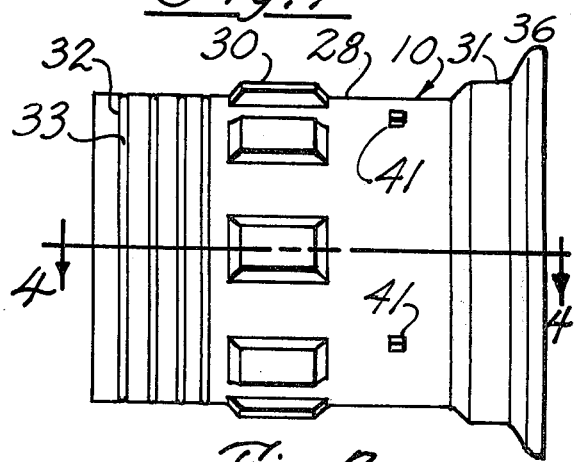
FIG. 2 is a side elevation of the fixed rim and wheel assembly.
Figure 4:
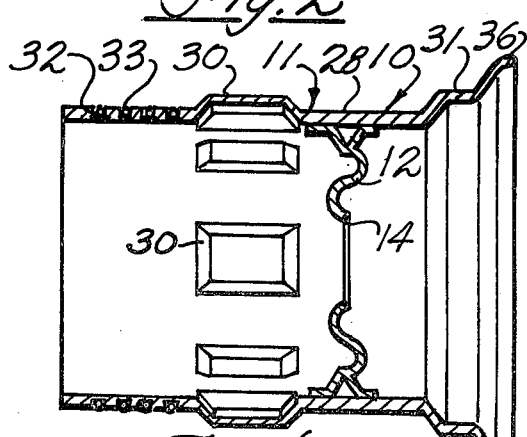
FIG. 4 is a cross-sectional view taken substantially along lines 4—4 in FIG. 2.

The modification in FIG. 7 is the same except that the removable outer rim 20', which is otherwise the same as rim 20, extends completely over the fixed portion 28 of fixed rim 11.

While I have shown and described a particular embodiment of this invention this is by way of illustration it does not constitute the only form since there are various alterations. changes, deviations, eliminations, additions, substitutions and departures which may be made in the embodiment shown without avoiding the scope of the invention as defined only by a proper interpretation of the appended claims.

What is claimed is:

1. In a demountable pneumatic tire rim assembly: a pneumatic tire rim assembly comprising a cylindrical support rim having a central mounting means thereon for fixed attachment to a vehicle, said support rim including a projecting portion extending therefrom, a removable rim having a projecting portion corresponding to at least part of the projecting portion of said support rim whereby said portions are assembled in coextensive and overlapping relationship to each other and whereby said removable rim is removably fitted to said support rim and a tire may be mounted and inflated on said assembled support rim and removable rim, and locking members on said removable rim which are formed by depressing the surface of the rim to form a plurality of cavities at the edge thereof out of the plane of the surface of the removable rim and which are engageable with corresponding locking members on said fixed support rim by relative motion there between to remove or replace same, and to retain said rims in coextensive overlapping relationship to receive the tire which is inflated thereon.

* * * * *